(12) United States Patent
Van der Galien

(10) Patent No.: US 8,985,486 B2
(45) Date of Patent: Mar. 24, 2015

(54) COMMINUTING DEVICE AND METHOD FOR COMMINUTING MATERIAL

(75) Inventor: Mark Van der Galien, Buitenpost (NL)

(73) Assignees: Harmke Van Der Galien, Buitenpost (NL); Mark Van Der Galien, Buitenpost (NL)

( * ) Notice: Subject to any disclaimer, the term of this patent is extended or adjusted under 35 U.S.C. 154(b) by 174 days.

(21) Appl. No.: 13/575,896

(22) PCT Filed: Jan. 27, 2011

(86) PCT No.: PCT/NL2011/050056
§ 371 (c)(1),
(2), (4) Date: Oct. 16, 2012

(87) PCT Pub. No.: WO2011/093707
PCT Pub. Date: Aug. 4, 2011

(65) Prior Publication Data
US 2013/0026265 A1    Jan. 31, 2013

(30) Foreign Application Priority Data

Jan. 27, 2010 (NL) .................................. 2004156

(51) Int. Cl.
*B02C 21/02* (2006.01)
*A01G 3/00* (2006.01)
*B02C 23/02* (2006.01)

(52) U.S. Cl.
CPC ............. *B02C 21/02* (2013.01); *A01G 3/002* (2013.01); *B02C 23/02* (2013.01)
USPC ..................................... 241/28; 241/101.763

(58) Field of Classification Search
USPC .............................. 241/101.763, 101.742, 28
See application file for complete search history.

(56) References Cited

U.S. PATENT DOCUMENTS

| 3,752,409 A | 8/1973 | Lewis |
| 4,140,281 A | 2/1979 | Fulghum, Jr. et al. |
| 5,419,502 A | 5/1995 | Morey |

FOREIGN PATENT DOCUMENTS

| DE | 3707515 A1 | 9/1988 |
| DE | 9313425 U1 | 1/1994 |

OTHER PUBLICATIONS

International Search Report and Written Opinion dated May 23, 2011, issued for corresponding PCT Application No. PCT/NL2011/050056.
International Preliminary Report on Patentability dated Jul. 31, 2012, issued for corresponding PCT Application No. PCT/NL2011/050056.

*Primary Examiner* — Mark Rosenbaum
(74) *Attorney, Agent, or Firm* — Banner & Witcoff, Ltd.

(57) ABSTRACT

The present invention relates to a comminuting device and method for comminuting material such as green waste, waste wood and/or demolition wood. The comminuting device comprises: —a comminutor (12) for comminuting supplied material; an infeed conveyor (10) operatively connected during use to the comminutor for supplying material to the comminutor; —an outfeed conveyor (14) operatively connected during use to the comminutor; a gripper (40) operatively connected during use to the comminutor for filling the infeed conveyor; and operating means operatively connectable to the comminutor.

9 Claims, 3 Drawing Sheets

COMMINUTING DEVICE AND METHOD FOR COMMINUTING MATERIAL

RELATED APPLICATION DATA

This application is a National Stage Application under 35 U.S.C. 371 of co-pending PCT application PCT/NL2011/050056, designating the United States and filed Jan. 27, 2011, titled "Comminuting Device and Method for Comminuting Material", which claims the priority benefit of NL Patent Application No. 2004156, filed Jan. 27, 2010, titled "Comminuting Device and Method for Comminuting Material", the entire disclosure of each of which is hereby incorporated by reference for all purposes.

The invention relates to a comminuting device for comminuting material. The comminuting device is more particularly used to comminute green waste, waste wood and/or demolition wood.

Comminuting devices known in practice comprise an infeed conveyor for supplying the material to be comminuted, for instance green waste, and an outfeed conveyor for discharging material comminuted with the device. The comminutor is provided between the two conveyors. Such a comminuting device is in practice often transported with a truck. A crane or power shovel is also transported for the purpose of filling the infeed conveyor with the material for comminuting.

The invention has for its object to provide a comminuting device with which material can be comminuted in a more efficient manner.

This object is achieved with the comminuting device according to the present invention, the comminuting device comprising:
- a comminutor for comminuting supplied material;
- an infeed conveyor operatively connected during use to the comminutor for supplying material to the comminutor;
- an outfeed conveyor operatively connected to the comminutor;
- a gripper operatively connected during use to the comminutor for filling the infeed conveyor; and
- operating means operatively connectable to the comminutor.

Providing a gripper connectable to the comminutor achieves that the infeed conveyor can be provided in efficient manner during use with material for comminuting. This obviates the need to provide a separate crane or power shovel. This has the additional advantage that the comminuting device can in principle be transported by one person to a desired location where material has to be comminuted. The transport of a separate power shovel or crane is not therefore necessary.

The material for comminuting is preferably green waste, waste wood and/or demolition wood. Such material usually has to be comminuted in order to enable efficient disposal and/or desired further use thereof. The invention can also be applied, if desired, for other material for comminuting, for instance domestic refuse.

The comminutor is preferably provided with a horizontal infeed. Providing a horizontal infeed avoids the material for comminuting being thrown or flung back out. This occurs relatively frequently in comminutors provided with a vertical infeed. An efficient comminuting of material is realized due to the horizontal infeed.

The operating means preferably comprise a cab for operating the device. A safe work situation is realized by providing such a cab, whereby it is also possible to operate effectively under all weather conditions.

In an advantageous preferred embodiment according to the present invention the comminuting device comprises transforming means for transforming the device from a transport mode to a use mode.

By providing transforming means the comminuting device can be transformed between at least a transport mode and a use mode and, if desired, vice versa. This achieves that the whole comminuting device can be transported in efficient manner. The whole comminuting device, therefore including the gripper, can be transported here with one truck. This means that, as soon as the desired location for the comminuting device has been reached, it is positioned and subsequently transformed from the transport mode to the use mode. Once all the material has been comminuted, the device is moved back from the use mode to the transport mode, after which the comminuting device can be transported further.

In the transport mode the cab is preferably located substantially in or adjacently of the infeed conveyor. This achieves that the cab can be transported in efficient manner, wherein the regulations applicable here are also complied with. The infeed conveyor is preferably designed here such that, when not in use, it contains sufficient space for receiving a substantial part of the cab during transport of the comminuting device. If the infeed conveyor is relatively small, the cab is preferably placed substantially adjacently of the infeed conveyor in the transport mode.

As alternative to a fixed element between the cab and a rotatable arm, in a further advantageous preferred embodiment the cab is connected to the rotatable arm via an extendable element. Such an element serves to carry the cab from the transport mode to a use mode. The extendable element is also used to carry the cab in reverse direction from the use mode to the transport mode. From a substantially horizontal direction during transport the cab is rotated a quarter-turn by the rotation movement into a substantially vertical direction so as to thereby enable use of the cab. Providing an extendable element, for instance in the form of a telescopic arm, achieves that a good position of the cab is realized during use and during transport.

In an advantageous embodiment according to the present invention the outfeed conveyor is provided with hinge means such that the outfeed conveyor can be placed in a transporting position over at least a part of the comminuting device.

By providing the hinge means the outfeed conveyor can be transformed between a position of use and a transporting position. Preferably the outfeed conveyor is as it were folded back here, whereby it comes to lie upside down on the other parts of the comminuting device.

In an advantageous preferred embodiment according to the present invention the gripper is provided rotatably at a fixed position.

A stable and robust construction of the comminuting device is realized by providing the gripper at a fixed position. The gripper can be carried to the material for comminuting by preferably operating the gripper with operating means from the cab, after which this material is carried into the infeed conveyor. A relatively large reach of this gripper is realized by preferably being able to rotate the gripper through 360°.

The present invention further relates to a method for comminuting material such as green waste, waste wood and/or demolition wood, the method comprising the steps of:
- providing a comminuting device as described above;
- transforming the comminuting device from a transport mode to a use mode; and
- comminuting material.

The method provides the same effects and advantages as those stated in respect of the comminuting device. An efficient comminuting of the material for comminuting is brought about by providing a comminuting device as described above. The transformation from a transport mode to a use mode preferably comprises of positioning a comminuting device. This usually comprises of folding out legs or uprights and subsequently removing a supporting frame. The transformation also comprises of positioning the outfeed conveyor. This positioning preferably relates to a movement of the conveyor out of the transport mode to the use mode comprising a rotation. The transformation also comprises of positioning the cab from the transport mode in the infeed conveyor to the use mode, preferably as described above, subsequently followed by positioning the gripper. The above stated advantages and effects are realized by the transformation.

Comminuting of the material comprises of taking hold of the material for comminuting with the gripper and subsequently positioning it in the infeed conveyor, after which the material is comminuted. The comminuted material is then discharged from the comminuting device with the outfeed conveyor.

Further advantages, features and details of the invention are elucidated on the basis of preferred embodiments thereof, wherein reference is made to the accompanying drawings, in which.

FIGS. 4A-D are views of successive steps of the transformation from the use mode to the transport mode.

Figure 1:
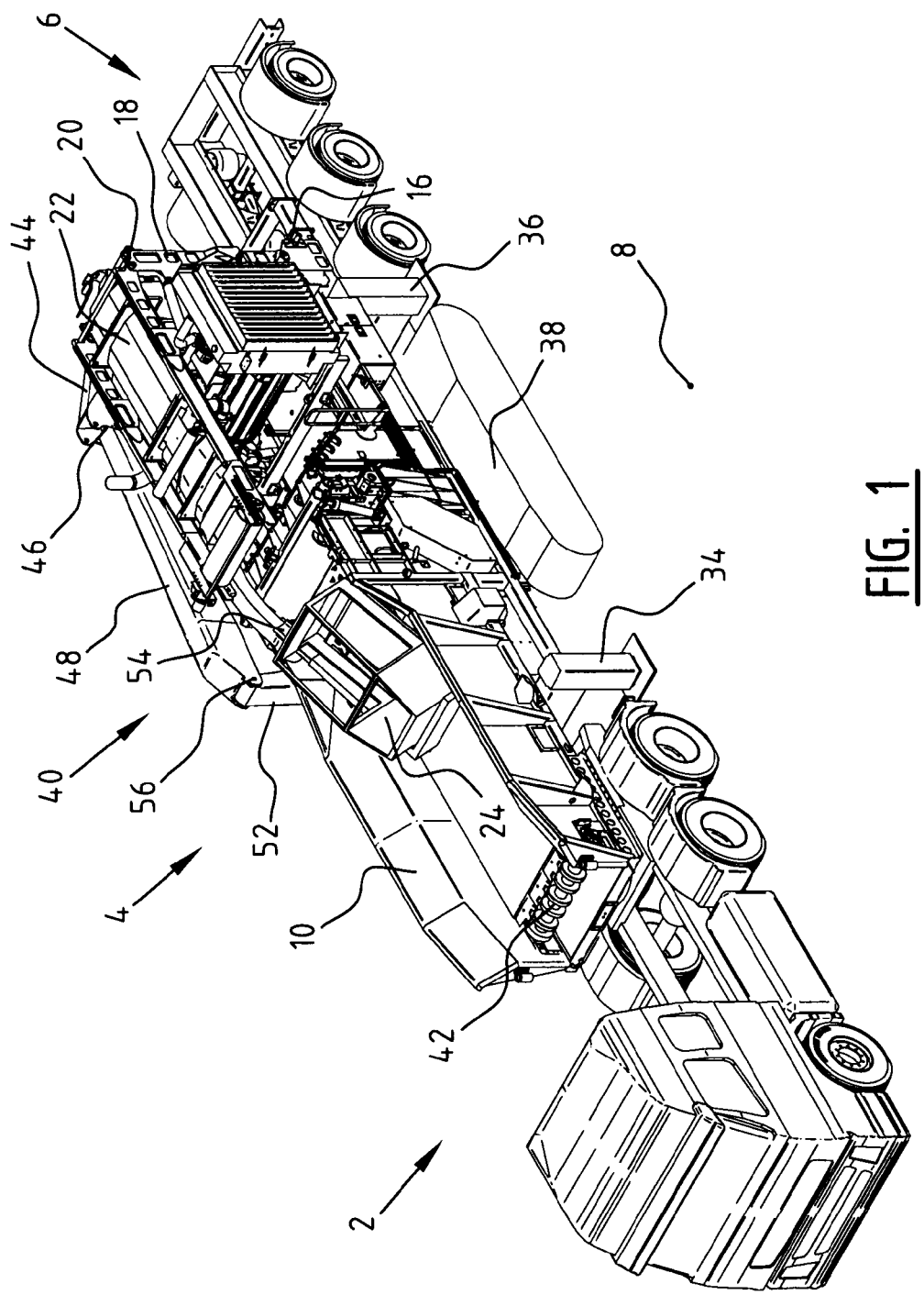
FIG. 1 is a side view of a corruninuting device according to the invention during transport.

A semi-trailer combination 2 with truck and trailer (FIG. 1) is used to transport a comminuting device 4. The front side of comminuting device 4 is connected here to the truck and the rear side is connected to a supporting frame 6. In this way comminuting device 4 can be transported over a ground surface 8. Comminuting device 4 is provided on one side with an infeed bin 10 and a shredder or comminutor 12. An outfeed conveyor belt 14 is provided on the other side of shredder 12. Outfeed conveyor belt 14 pivots around rotation shaft 16 on which the first part 18 of outfeed conveyor belt 14 is rotatably mounted. Outfeed conveyor belt 14 is further provided with a second rotation shaft 20 between first part 18 and a second part 22 of outfeed conveyor belt 14. Comminuting device 4 further comprises a cab 24 which is connected using an arm 26 to upright 28 via a rotation shaft 30. In the transport mode cab 24 is situated substantially in the interior of infeed bin 10. Further provided on arm 26 is a cylinder 32 with which cab 24 can be lifted to some extent out of infeed bin 10.

A first set of legs 34 is provided on the side of infeed bin 10. A second set of legs 36 is provided on the side of the outfeed conveyor belt. In the shown embodiment caterpillar tracks 38 for positioning comminuting device 4 are provided between the first and second set of legs 34, 36. Comminuting device 4 also has a gripper arm 40.

In the shown embodiment a comminuting device 4 has a capacity of about 100 tonnes of green waste per hour depending on the material to be comminuted. The weight of device 4 lies between 15 and 25 tonnes. Infeed bin 10 has a volume of about 5 to 10 m$^3$. In the shown embodiment outfeed conveyor belt 14 has a width of about 90 em and during use carries the comminuted material to a height of about 5 meters. The overall length of device 4 amounts in the shown embodiment to about 10 meters, with a height in the range of 3.5 to 5 meters. Other embodiments have corresponding dimensions.

Figure 2:
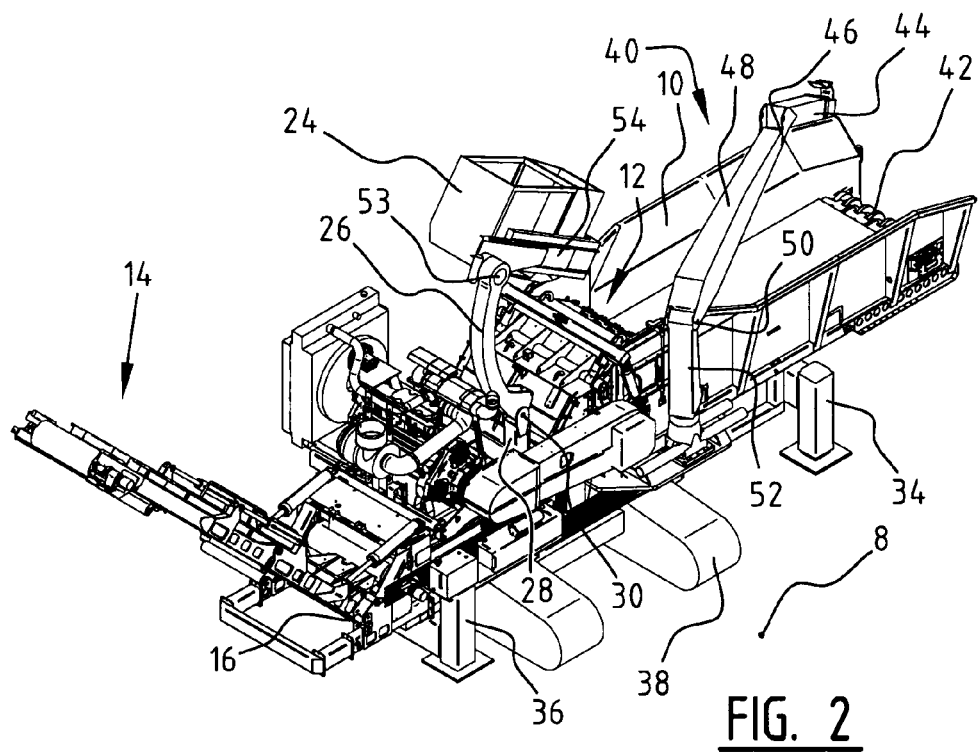
FIG. 2 is a perspective view of the comminuting device of FIG. 1.

Infeed bin 10 is provided with drive rollers 42 {FIG. 2} for infeed of the material to be comminuted. Gripper 40 is provided with an end part 44 which is connected to a central part 48 using hinge 46. Central part 48 is connected via hinge 50 to upright 52. In a transport mode cab 24 is located for the greater part in the interior of infeed bin 10 and connected to arm 26 using hinge 53.

Figure 3:
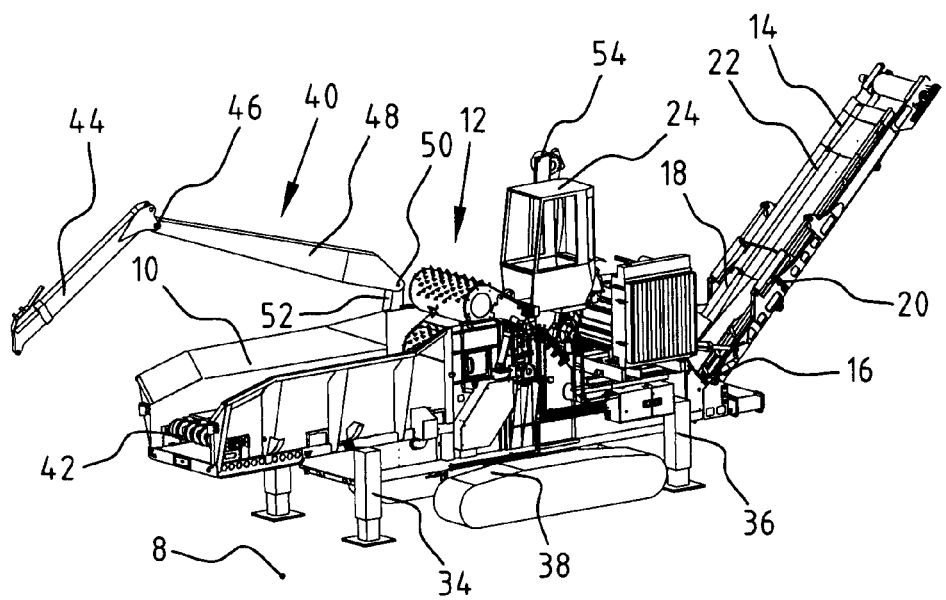
FIG. 3 is a view of the comminuting device of FIG. 2 in a use mode.
Figure 4A:
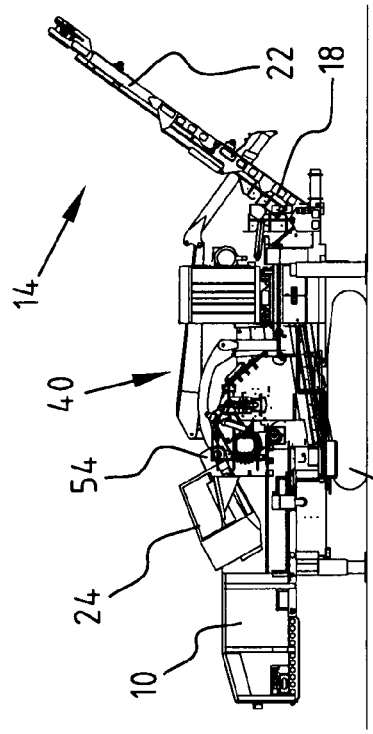
Figure 4B:
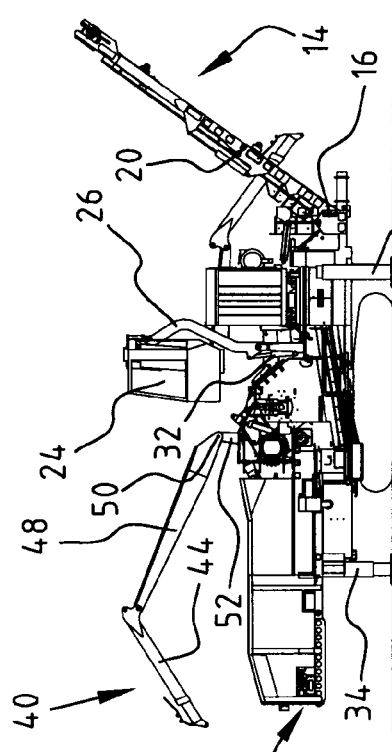
Figure 4C:
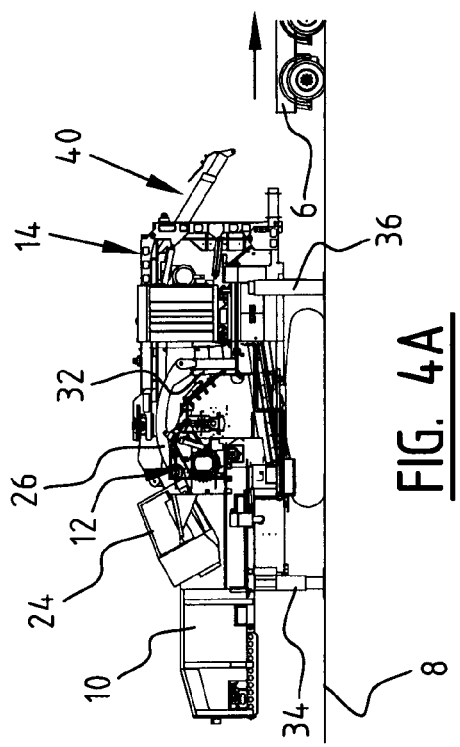
Figure 4D:
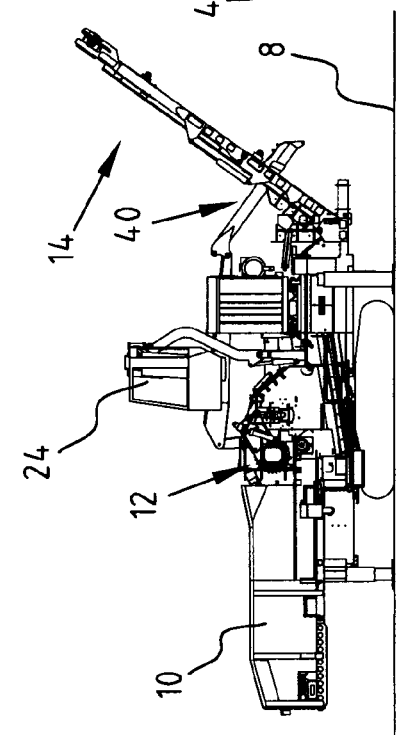

Comminuting device 4 is positioned in a use mode {FIG. 3} using first and second set of legs 34, 36. Outfeed conveyor belt 14 is folded out from the transport mode and suitable for use. Cab 24 is provided in the shown embodiment with an extendable arm 54.

During the transformation of comminuting device 4 from the transport mode to a use mode {FIG. 4A-D} the first and second set of legs 34, 36 are set down on a ground surface 8, optionally after positioning using caterpillar tracks 38. Supporting frame 6 is then removed. The truck is subsequently uncoupled from comminuting device 4. Outfeed conveyor belt 14 is then folded out using hinges 20, 16 in order to thereby bring outfeed conveyor belt 14 into readiness for use in discharging the comminuted material. In a subsequent step cab 24 is placed in the use mode. Arm 26 is for this purpose moved upward to some extent by rotation around rotation shaft 30 using cylinder 32. Arm 26 on which cab 24 is mounted can then be rotated such that cab 24 is moved out of infeed bin 10. Cab 24 can then rotate around hinge 53 with the extendable arm 54 connected thereto for efficient positioning of cab 24 relative to comminuting device 4. Ina final step gripper 40 is folded out and thereby carried into position ready for use. Once all the material has been comminuted, the stated steps are performed in reverse sequence in order to move comminuting device 4 from the use mode to the transport mode and so enable transport.

During comminuting of for instance green waste, the green waste to be comminuted is carried into bin 10 using gripper 40. The green waste is carried by rollers 42 to shredder 12 where the green waste is comminuted. On the other side of shredder 12 the material is carried onto outfeed conveyor belt 14. The comminuted green waste is then transported further and/or used further.

The present invention is by no means limited to the above described preferred embodiments thereof. The rights sought are defined by the following claims, within the scope which many modifications can be envisaged.

The invention claimed is:

1. A comminuting device, comprising:
a comminutor for comminuting supplied material;
an infeed conveyor operatively connected during use to the comminutor for supplying material to the comminutor;
an outfeed conveyor operatively connected during use to the comminutor;
a gripper operatively connected during use to the comminutor for filling the infeed conveyor; and
operating means operatively connectable to the comminutor and comprising a cab for operating the device; and
transforming means for transforming the cab from a transport mode to a use mode and comprising an arm for moving the cab;
wherein the cab in the transport mode is located substantially in or adjacent the infeed conveyor.

2. A comminuting device as claimed in claim 1, wherein the comminutor is provided with a horizontal infeed.

3. A comminuting device as claimed in claim 1, wherein the cab is connected via an extendable element to a rotatable arm for the purpose of carrying the cab from the transport mode to the use mode.

4. A comminuting device as claimed in claim 3, wherein the outfeed conveyor is provided with hinge means such that the outfeed conveyor can be placed in a transporting position over at least a part of the comminuting device.

5. A comminuting device as claimed in claim 1, wherein the gripper is provided rotatably at a fixed position.

6. A comminuting device as claimed in claim 1, wherein the material comprises green waste, waste wood and/or demolition wood.

7. A method for comminuting material such as green waste, waste wood and/or demolition wood, comprising the steps of:
   providing a comminuting device as claimed in claim 1;
   transforming the comminuting device from a transport mode to a use mode; and
   comminuting material.

8. The method as claimed in claim 7, wherein the transformation from a transport mode to a use mode comprises the steps of:
   placing a comminuting device;
   positioning the outfeed conveyor;
   positioning the cab from the transport mode in the infeed conveyor to the use mode; and positioning the gripper.

9. The method as claimed in claim 7, wherein the comminuting of the material comprises:
   taking hold of the material for comminuting with the gripper;
   placing the material for comminuting in the infeed conveyor;
   comminuting the material with the comminutor; and
   discharging the comminuted material with the outfeed conveyor.

* * * * *